United States Patent [19]

Walter et al.

[11] Patent Number: 4,563,315
[45] Date of Patent: Jan. 7, 1986

[54] PRODUCTION OF PARTICULATE SOLIDS IN ROTARY FLUIDIZER

[75] Inventors: Karl H. Walter, Henley South; Robert L. Hill, Panorama, both of Australia

[73] Assignee: Adelaide & Wallaroo Fertilizers Ltd., Adelaide, Australia

[21] Appl. No.: 536,320

[22] Filed: Sep. 27, 1983

[30] Foreign Application Priority Data

Sep. 27, 1982 [AU] Australia ............................. PF6073

[51] Int. Cl.[4] ................................................ B29B 9/00
[52] U.S. Cl. .................................... 264/8; 23/313 FB; 34/33; 264/12; 264/13; 264/121; 264/DIG. 51; 425/8; 425/10; 425/222
[58] Field of Search .............. 264/8, 12, 13, DIG. 51; 425/8, 10, 222; 427/213; 23/313 FB

[56] References Cited

U.S. PATENT DOCUMENTS

| | | |
|---|---|---|
| 244,148 | 7/1881 | Rowe . |
| 268,587 | 12/1882 | Witherell et al. . |
| 506,915 | 10/1893 | De Kinder et al. . |
| 506,916 | 10/1893 | De Kinder et al. . |
| 506,917 | 10/1893 | De Kinder et al. . |
| 535,560 | 3/1895 | Schmiedecke et al. . |
| 2,354,567 | 7/1944 | Adt . |
| 2,834,044 | 5/1958 | Antonsen et al. ............... 425/222 |
| 2,840,922 | 7/1936 | Erisman et al. . |
| 2,887,718 | 5/1959 | Curran et al. .................... 264/13 |
| 2,890,942 | 6/1959 | Webster et al. .................. 425/222 |
| 3,255,036 | 6/1966 | Kramer et al. ................ 23/313 FB |
| 3,262,218 | 4/1963 | Cymbalisty . |
| 3,312,530 | 4/1967 | Sackett ............................ 264/13 |
| 3,402,229 | 9/1968 | Felder ............................ 425/222 |
| 3,449,106 | 6/1969 | Paden et al. .................... 425/222 |
| 3,580,545 | 5/1971 | O'Brien ........................... 425/222 |
| 3,588,950 | 6/1971 | Marshall ......................... 425/8 |
| 3,678,598 | 7/1972 | Quiles . |
| 3,738,821 | 6/1973 | Barber ........................ 23/313 FB |
| 3,742,613 | 7/1973 | Von Gimborn . |
| 3,761,549 | 9/1973 | Marshall ......................... 427/213 |
| 3,816,070 | 6/1974 | Candor et al. ................... 8/158 |
| 3,843,393 | 10/1974 | Groppenbacher et al. ........ 427/213 |
| 3,856,441 | 12/1974 | Suzukawa et al. ................ 264/12 |
| 3,877,415 | 4/1975 | Blouin ............................ 427/424 |
| 3,936,534 | 2/1976 | Schallis ...................... 23/313 FB |
| 3,991,225 | 11/1976 | Blouin ............................ 427/212 |
| 4,213,924 | 7/1980 | Shirley, Jr. ...................... 264/7 |
| 4,353,852 | 10/1982 | Tse ................................ 425/222 |

FOREIGN PATENT DOCUMENTS

| | | |
|---|---|---|
| 0077442 | 3/1972 | Japan ....................... 264/DIG. 51 |
| 603654 | 6/1948 | United Kingdom . |
| 1405740 | 9/1975 | United Kingdom . |
| 1581761 | 12/1980 | United Kingdom . |
| 2064995 | 6/1981 | United Kingdom . |

*Primary Examiner*—Jeffery Thurlow
*Assistant Examiner*—Patrick Dailey
*Attorney, Agent, or Firm*—Fleit, Jacobson, Cohn & Price

[57] ABSTRACT

A method and apparatus for granulation in which particulate feed material is charged into a rotary cylindrical vessel (12) having its axis disposed horizontally, and respective cover plate (16,18) at each end for retaining the feed material, and a treatment gas and a process liquid is passed into the vessel during rotation of the latter. The gas is supplied from a source thereof, via a supply pipe (34), and discharged within a bed of the feed material (38) in the vessel (12) through port means (44,48) of at least one discharge conduit (42) which is in communication with the supply pipe (34), extends longitudinally within the vessel (12) and is fixed against rotation with the vessel (12); and the process liquid, selected from solutions, suspensions and melts of solids to be granulated, is distributed over the surface of the bed of feed material from sprays (59) spaced longitudinally in the vessel (12) to effect heat transfer between the feed material, the treatment gas and the liquid for formation granules of the solid and feed material.

12 Claims, 7 Drawing Figures

PRODUCTION OF PARTICULATE SOLIDS IN ROTARY FLUIDIZER

This invention relates to apparatus and a method for the production of dense particulate solids from their solutions, suspensions or melts.

This invention has particular application to the formation of granular solids in a single step process from pumpable liquids and suspensions by evaporation or cooling and the following description is directed at that application.

The recovery of solids from their solutions, suspensions or melts as well as the physical characteristics of these recovered solids is of great commercial significance in many diverse areas of the modern process industry.

The suitability of a product in commerce depends upon such factors as particle size distribution, particle hardness, sphericity, surface texture etc. These factors greatly affect such properties as flowability, tendency to cake and dustiness. In the case of toxic and irritating solids the production of non-dusting particulates is of great importance. The great demand for dust-free particulates, which have excellent physical properties, has stimulated the development of processes which convert solids in a finely divided state into a dust-free granular form. Most of these granulation processes achieve particle size enlargement by the agglomeration of wetted fine particles in a tumbling bed of solids. This means that the finely divided solids, which might have been recovered from their solutions, suspensions or melts, require an additional treatment in a separate process for their conversion into a granular free-flowing form.

The single step granulation processes produce stable, dense and dust-free particles from the liquid phase by either the evaporation of the solvent from the solution or suspension containing the solid in a dissolved or suspended form or by the cooling of the molten solid.

Lead shotting and flaking are processes which have been used for a long time. Over the last 40 years or so, this technique, which is based upon the congelation of droplets in a cooling medium, has been used on a very large scale, sometimes, for the production of spherical granules or "prills" from the melt of chemically stable fusible solids.

Prilling processes consist basically of a droplet forming device, which might be a simple pipe with holes, a shower head, or a perforated basket, and a free-falling section for the droplets produced by any of these devices. While falling through this section, the fused droplets are cooled by the cooling fluid which can be liquid or gaseous.

While prilling processes have found ready acceptance in the chemical industry, they suffer from a number of disadvantages. One of these disadvantages lies in the fact that the droplet size of the molten substance determines the final size of the prill. This means, therefore, that a great deal of attention has to be given to the formation of the droplets and their size if excessive remelting of prills not meeting the desired sizing is to be avoided. Another disadvantage lies in the fact that the greater the size of the prill required, the greater will be the height of the prilling tower for the removal of the heat to achieve a congelation of the droplets.

While it is possible to increase the heat transfer by increasing the velocity of the cooling medium which flows countercurrently to the falling stream of prills, the increase in the velocity of the cooling medium leads to an increased entrainment of small prill sizes. As a result, extremely expensive pollution abatement equipment has to be installed.

Despite these and other disadvantages, air prilling towers have been, and are, used for the forming of spherical granules by congealing the materials such as urea, sulphur, ammonium nitrate, calcium ammonium nitrate, calcium nitrate, ammonium phosphates, waxes and resins. While prilling of most of these materials employs air as a cooling medium, the prilling of sulphur is mostly carried out in water. Such sulphur prilling processes are generally referred to as "sulphur forming" and have as their main objective reduction of the dust content of solid sulphur and thus considerably reduce the problems caused by sulphur dust in regard to environmental pollution, dust explosions, fire risks and product loss by wind.

Over the last 20 years or so we have seen the development of many new sulphur forming processes. Sulphur processes based on the technique of prilling employ either water or air as a cooling medium. The water based cooling processes are less capital intensive and require much smaller prilling tanks. Unfortunately any residual water in the resultant sulphur prill forms sulphuric acid, which causes problems in regard to chemical attack on steel plates in railway trucks and in ships. While from a purely chemical point of view, sulphuric acid and sulphur in contact with a steel plate should not form iron sulphide, it has been observed in recent years that a "quasi-pyrrhotite" iron sulphide can form in the hold of a ship if water and sulphur are in contact with steel plates. Since these sulphides of iron are pyrophoric they lead to serious fire hazards during the stock-piling of the highly combustible sulphur.

Air-cooled sulphur prilling towers, which generally produce a superior sulphur prill, are extremely expensive; while a great deal of operational attention to their droplet producing device is required, if dust explosions with undersize droplets are to be avoided. An air prilling tower normally has a height of 60 m. The prill size of the material produced from such a tower is about 2.0 mm to 3.5 mm.

Another type of sulphur forming process is based on the solidification of the molten sulphur on either an endless belt or a flaking drum. The molten sulphur is either poured onto the endless conveyor belt or sprayed onto a cooled rotating drum for cooling and solidification. The flakes of sulphur produced from the endless belt are not very hard, are irregularly shaped, and are not very resistant to abrasion and easily degrade during handling and storage.

Whilst the element sulphur is non-toxic, its dust is very irritating and, for this reason, the sulphur forming processes based upon the technique of flaking and slating will slowly be superseded by processes producing a more acceptable product from a physical quality point of view.

The same does not apply, however, to the congelation of aluminium sulphate. The latter is a very important commercial chemical which is used in the dyeing and printing of cloth and as a flocculant in the purification of water. While aluminium sulphate forms a great number of hydrates, the solubility of this salt is so high that it will dissolve in its water of hydration. Endless belts as well as air cooling are used in commerce for the solidification of highly concentrated aluminium sulphate solutions. While aluminium sulphate can be solidified by cooling on a drum flaker or an endless belt, this process is not a process of congelation but a process of crystallization. Depending upon the strength of the highly concentrated aluminium sulphate solution, the solidified aluminium sulphate will contain between 10 to 14 moles of water per mole of aluminium sulphate. While, generally speaking, the dustiness of slated or flaked aluminium sulphate surprisingly does not cause the same amount of problems as dustiness in sulphur, aluminium sulphate dust has to be classified as hazardous. Similar to sulphur, aluminium sulphate dust is non-toxic but severely irritating to eyes, nose and throat, as well as to the skin. This means that the need exists for a denser, as well as spherical, aluminium sulphate particle which has no protrusions that can be abraded and which has at the same time a smooth surface texture.

Prilling towers, endless belts and flaking drums have been and are used for the solidification of pumpable liquids by cooling. However, these processes either yield a product having poor physical quality or require a great amount of capital for the installation of plant, while they often have severe operational limitations in regard to factors such as sizing.

Thus it is not surprising that over the last 30 years or so, the process industry has started to utilise the excellent heat and mass transfer of fluid bed systems for the recovery of solids from their solutions, melts or suspensions. Fluid bed systems have excellent mass and heat transfer properties which can give increases in heat transfer as high as one hundred fold in comparison with more conventional non-fluid bed systems. In addition, fluid bed systems achieve in the fluidised state a high degree of solids mixing. The excellent heat transfer and mass transfer as well as its outstanding solid mixing properties were prerequisites for the development of spray granulation.

Granulation in a fluid bed system is achieved by uniformly dispersing pumpable liquids, which may be solutions, suspensions or melts, throughout the bed. Collisions between the solid particles and finely divided liquid particles lead to the layering of solids onto the surface of the solid particles, after which either the solvent is removed by the hot fluid or the molten liquid is congealed by the cooling effect of the fluid. The growth mechanism in these fluid bed systems thus occurs by an onion skin like layering growth and by agglomeration so that the solid granule consists of successively deposited layers of material. In addition, agglomerative granule growth by coalescence is encountered when particles which still have a liquid film on their surface collide with each other in the fluid bed.

While fluid bed granulation yields an excellent product and gives high thermal efficiencies, size enlargement by either spray granulation or melt granulation in a conventional fluid bed suffers from the following disadvantages:

(a) Only granules of uniform size can easily be fluidised, since a bed of granular material having an open size spectrum does not easily fluidise and very often cannot be fluidised at all.

(b) The greater the granule size the greater will be the fluidising velocity required to achieve fluidisation.

(c) Large differences in the size spectrum of the granules will lead to the elutriation of the small granules by the fluid, to the settling out of the coarse fractions at the bottom of the fluidising chamber, and to an irregularity of fluidisation known to those experienced in the art as channelling.

(d) The hydrodynamic resistance of fluid bed systems is very high and requires expensive high pressure blowers to achieve a state of fluidisation.

(e) The liquid dispersed into the fluid bed often forms solid fine particles before colliding with a granule; these fine particles becoming entrained in the fluid and removed from the bed. We have found in the operation of a conventional fluid bed granulator that about 10% of the solid in the atomised liquid is elutriated from the bed and has to be collected in expensive gas cleaning equipment.

(f) While fluid bed systems possess excellent solid mixing properties, the high degree of agitation in the bed, as well as thermal stresses in the bed, degrades the freshly formed granules to a certain extent and again limits the upper size of the granules produced by this means.

It is generally recognised that it is difficult to employ a conventional fluid bed granulation system for the production of granules much greater than 2.5 mm in diameter. There can be little doubt that channelling, hydrodynamic resistance as well as degradation of the particles in the bed are responsible for these limitations in regard to granule size.

A process developed by the National Research Council of Canada utilises the phenomenon of "channelling" in its spouted bed technology. While in a conventional fluid bed channelling of the fluid leads to a defluidisation of the remainder of the bed, a spouted bed relies upon the formation of a spout in a cylindrical vessel for its fluid-solid contact. The fluid enters the spouted bed through a relatively small inlet in the conical base of the cylindrical vessel. While travelling through the centre of the bed, the fluid carries solids picked up by this gas stream in the conical base and ejects them from the bed in a fountain-like manner (spout). The centre of the spouted bed is a dilute solid-fluid phase. The particles from the spout are returned from the top of the bed to the cone of the vessel in the "annulus" by a dense phase flow, where they are again picked up for another cycle by the fluid flowing through the spout.

The liquid to be formed into a solid in a one step operation is normally atomised or sprayed into the fluid entering the inlet of the spouted bed, where it is deposited onto the surface of granules picked up from the conical part of the "annulus". While circulating through the spout the solids which are in solution or their molten state crystallise out onto the surface of the granules, forming another onion skin like layer.

K. B. Mathur, one of the inventors of the spouted bed process, claims in his textbook "Spouted Beds" (Academic Press New York 1974) that the process allows:

(a) higher, or in the case of melt granulation lower, inlet gas temperatures due to excellent gas-solid contact in the high velocity region at the base of the spout with consequent rapid cooling or warming up of the inlet gas;

(b) formation of well rounded and uniform granules through the cyclic movement of the solids which favours growth by layering as opposed to coalescence of bed particles;

(c) narrow product size distribution, in part due to a classification effect at the top of the annulus which allows the outlet pipe to be located so as to remove primarily the largest granules;

(d) avoidance of problems with distribution plate scaling, especially in cases where granulation is combined with chemical reaction and drying.

One of the commercial processes employing spouted bed technology is the "Perlomatic Sulphur Forming Process", which was developed by Potasse et Engrais Chimiques S.A. of Paris, in France.

Nioh, S. teaches in his European patent application No. 26 918 that spouted beds can be used for the production of granular urea having a desired particle size distribution, by controlling the size distribution of the seed particles in the recycle stream to the spouted bed. Kinno, B. discloses in his patent application, German DE-OS No. 30 43 440, that it is possible to use a combination of spouted beds and conventional fluid beds for the melt granulation of urea.

Like conventional fluid bed systems, spouted bed granulation systems require high pressure blowers for the pumping of the gas stream to overcome the high hydrodynamic resistance of the bed. In addition, a certain percentage of the solid in the injected liquid does not come in contact with granules and is elutriated in the fluid. The entrained solids, which are very finely divided, have to be removed from the gas stream in expensive gas cleaning equipment.

Another single step system for the recovery of solids in the form of granules from their melts, solutions or suspensions is based on the drum granulation process, which has been employed for a long period for the agglomerative granulation of fines by coalescence. Modifications to conventional granulation drums disclosed by O'Brien in U.S. Pat. No. 3,580,545 entail fitting a cage of lifter rods inside the periphery of the granulating drum, together with a spiral ribbon between the lifter rods of the cage and the periphery of the drum. While rotating, materials in the granulating drum form a constant density curtain with the free floating cage in the drum. The constant density curtain in the drum is generated by the fact that the cage, together with the centrifugal forces generated by the rotating drum, hold the material between the cage and the drum, until it falls under the influence of gravitational forces through the rods of the cage. O'Brien teaches that sticking agents sprayed onto this falling curtain achieve uniformly sized granules, although it is not proposed that this apparatus could be used for the single step granulation of solutions, suspensions or melts of solids. There is no provision in this apparatus for the application of heat or for the removal of heat, and it basically represents an agglomeration device.

G. M. Blouin, who assigned his invention to the Tennessee Valley Authority, disclosed in U.S. Pat. Nos. 3,877,415 and 3,991,225 a rotating drum which is equipped with lifting flights and a deflector pan fixed within the upper section of the drum. The plate deflects the particles falling from the lifters to the side of the drum, where they form a dense narrow falling cascade. Coating is sprayed onto this dense falling cascade.

An improvement to this process was disclosed in U.S. Pat. No. 4,213,924, which shows that the atomisation of water in the form of an extremely fine mist, without impinging onto the granules in the falling curtain or onto the internals of the granulator, will greatly improve the heat transfer in this device. While this device was originally developed for the coating of granular products with a uniform protective coat, more recent disclosures show that the device can be used for the solidification of urea and sulphur. However, it is apparent that the device has an extremely poor heat transfer and, by the misting of water the TVA tried to improve its performance. While misting does slightly improve the performance, the gas-solid contact is still extremely poor in comparison with a fluid bed granulator. The poor gas solid contact is entirely due to the fact that the cooling medium is passing through the drum and, since the falling curtain of granules offers a greater resistance to the gas flow than the empty space, only a small portion of the particles come into contact with the cooling air. Another disadvantage of this device lies in the fact that, during their formation, the granules have to pass several times through the spray zone and hence the granules are repeatedly subjected to crushing forces caused by impact at the end of the free fall.

It is the object of the present invention to provide a process and apparatus for either the single step recovery and processing of solids from their solutions, suspensions or melts or the application of a coating from its solutions, suspensions or melts onto granules, without suffering disadvantages such as discussed above in relation to prior processes and apparatuses.

As a result of intensive investigations we have found that it is possible to achieve a quasi-fluidised state by placing a treatment gas distribution system into a tumbling bed of particulate matter in a rotating drum and by spraying or otherwise discharging a processing liquid selected from a solution, suspension and melt of the solid onto the surface of the tumbling bed, preferably without wetting the interior of the drum.

The present invention utilises in its process technology an apparatus consisting of a rotatable drum comprising a cylindrical vessel having its axis disposed horizontally, preferably with the axis inclined to the horizontal so end is raised relative to the other end and having a respective plate at each end of the vessel for retaining and controlling the quantity of solids within the vessel, and means for charging both the treatment gas and processing liquid into the vessel, the arrangement being such that, during the rotation of the vessel, granules in the vessel will form a tumbling bed in which they are partially fluidised by said gas and onto which is discharged the liquid.

In one form of the invention, there is provided apparatus consisting of such rotatable cylindrical vessel in which there are means for separate supply of treatment gas and process liquid to the bed; the means for supplying gas comprising at least one conduit extending longitudinally in the vessel at a location enabling discharge of the gas within the bed along a substantial portion of the length of the vessel, the at least one conduit being fixed against rotation with the vessel; and the means for supplying process liquid comprising at least one conduit extending longitudinally in the vessel at a location above the bed enabling the liquid to be sprayed down onto the bed along a substantial portion of the length of the vessel.

The invention also provides a process for spray granulation in such rotatable cylindrical vessel in which the vessel is rotated such that granules therein form a tumbling bed and, during rotation of the vessel, treatment gas and processing liquid are supplied separately to the bed; the gas being discharged within the bed along a substantial portion of the length of the vessel from at least one conduit fixed against rotation with the vessel; and the liquid being sprayed down onto the bed along a substantial portion of the length of the vessel from at least one conduit located above the bed.

Most conveniently, there is a plurality of the gas discharge conduits spaced circumferentially in the vessel, each located for discharge of gas within the bed of granules. The or each such conduit thus will be in the one of the lower quadrants of the vessel in which the bed principally is located. The or each conduit may be spaced from the inner surface of the vessel by a distance which is a minor portion of the radius of the vessel. Arrangements for the gas discharge conduits may be as disclosed in our co-pending Australian patent application No. 87086/82 and corresponding International application No. PCT/AU82/00125, relating to apparatus for the treatment of granular material, or as detailed herein with reference to the drawings.

A single process liquid discharge conduit, having longitudinally spaced spray nozzles, normally is adequate, but in the case that the process liquid cannot be sprayed other means can be employed. However, two or even more laterally spaced such conduits can be used, if required.

Granulation most conveniently is conducted on a continuous, or semi-continuous, basis and is started with an initial supply of granular material. Most conveniently, the processing liquid is sprayed or otherwise discharged over a major portion of the length of the bed spaced from the inlet end, to leave a dry section of the bed at the exit end. Such section can be up to about one third of the length of the bed. The treatment gas discharged into the bed needs to be heated where the process liquid sprayed or otherwise discharged onto the bed is a solution or suspension. The heated fluid may be air, an inert gas, or (typically) gaseous products of combustion of a fuel, and serves to evaporate the solvent or carrier liquid (typically water). However, where the process liquid is a melt, the gas need not be heated or may be heated to a temperature below the solidification temperature for the liquid; the gas of course, serving to cool the liquid by controlling the temperature of the bed.

The principal advantages of placing the gas distribution system into the tumbling bed of solids are that this provides:

(a) means for increased tumbling of the bed of solids;

(b) means of an increased degree of fluid-solid mixing by utilizing low pressure fluid at velocities well below the elutriation velocities for the solid particles;

(c) means for highly efficient heat and mass transfer;

(d) means of producing stable, dense and spherical granules of any size without encountering the severe problem of particle entrainment, which requires expensive gas cleaning equipment for pollution control.

The benefits of this invention are best recognised by the fact that it can be used for the spray granulation of copper sulphate, zinc sulphate, cobalt sulphate, manganese sulphate, iron sulphate and many other inorganic salts, as well as the melt granulation of such substances as sulphur, urea, ammonium nitrate, calcium ammonium nitrate and ammonium phosphates, the pseudo-melt granulation of aluminium sulphate, the coating of granules with one or more other substances such as the sulphur coating of urea, as well as the removal of liquid from pastes.

An understanding of the process and the apparatus used for performing this process will best be understood from the following description and accompanying drawings in which.

Figure 1:
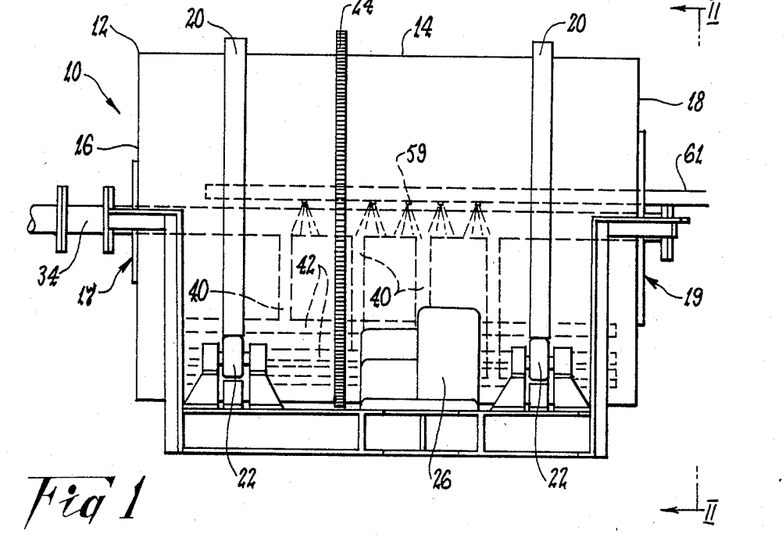
FIG. 1 shows one form of apparatus in side elevation.
Figure 2:
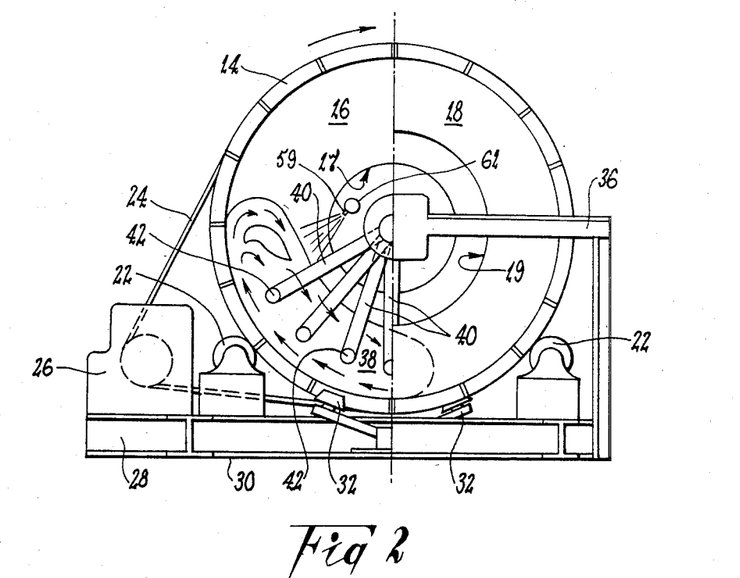
FIG. 2 is partial end elevation of the apparatus of FIG. 1, in the direction of arrows II—II.

In FIGS. 1 and 2, the rotary fluidiser apparatus consists of a cylindrical vessel 12 as in a conventional granulating drum, which has a cylindrical shell 14 and annular end cover plates 16,18 integral with shell 14. Drum 12 is supported in a conventional manner, by two riding rings of tires 20 each running on a pair of trunnion wheel assemblies 22. The drum is rotated by means of a conventional drive system which incorporates a circumferential chain 24 and drive motor 26. The drum trunnion assemblies, drive motor and support bracket for motor 26 are all mounted on a common base 30. Thrust roller assemblies 32 are used to prevent movement of the drum along the axis of rotation.

Apparatus 10 includes a supply pipe 34 which passes through drum 12 and is supported at each end of drum 12 by means of support brackets 36 attached to base 30. Pipe 34 passes through the opening of annular plates 16,18. Annular plates 16,18 serve to retain the bed 38 of solid particles during tumbling of the particles on rotation of drum 12.

Supply pipe 34 is in communication with radial headers 40 which extend toward the inner surface of drum 12, and from which the conduits 42 extend longitudinally within drum 12, in bed 38.

The respective ends of each conduit 42 are spaced slightly from plates 16,18 such that treatment gas received from pipe 34 can be discharged into bed 38 from conduits 42 over the major portion of the length of drum 12. The portion of a conduit 42 shown in FIG. 3 has along its length three rows of outlet ports or apertures 44 for such discharge of treatment gas. The apertures of successive rows are off-set, and to increase spreading of gas passing therethrough, each outlet has a conically flared outer end 46. The portion of the alternative form of conduit 42 shown in FIG. 4 has two longitudinally extending outlet slots 48. While slots 48 are shown as parallel sided and continuous, their sides may diverge outwardly, and/or they may be discontinuous.

In the arrangement of FIGS. 1 and 2, there are four conduits 42. One of these is located on a vertical plane through the axis of drum 12, with the others being laterally spaced from this plane in the direction of rotation for drum 12. Conduits 42 thus are in the lower quadrant of drum 12 in which the bulk of the material of bed 38 is located immediately prior to being lifted to tumble down in drum 12. In view of this location, and the position of the conduits in relation to the inner surface of the drum, the conduits extend within the bed of particles prior to the particles being lifted to tumble down in the drum. As a consequence, conduits 42 provide a tumbling or mixing action within the bed and enhance fluid-solid contact. Conduits 42 may be circumferentially moveable, such as by rotation of pipe 34 to enable their position within the bed to be varied in either direction from the position shown in FIGS. 1 and 2 so as to enhance such contact.

Figure 3:
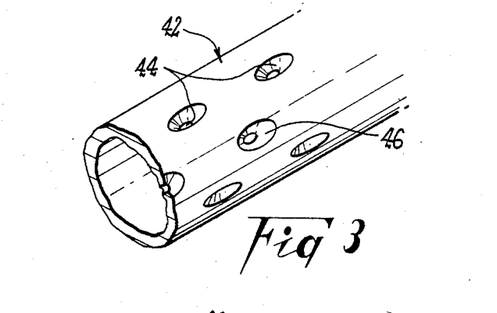
FIG. 3 shows on an enlarged scale one form of a section of a conduit used in the apparatus of FIGS. 1 and 2.
Figure 4:
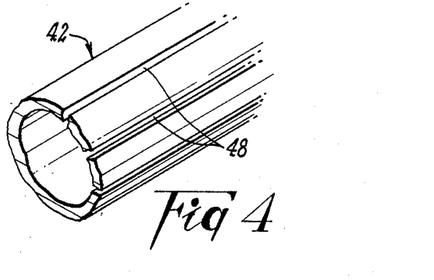
FIG. 4 shows, in a view similar to FIG. 3, a section of an alternative form of conduit.

Outlet apertures 44 or slots 48 most conveniently are arranged so that gas released therefrom passes downwardly from conduits 42, such as radially or in a direction inclined to the radial in the direction of rotation. As a consequence, the gas remains in contact longer with the material of the bed before being lifted beyond the conduits 42.

Figure 6:
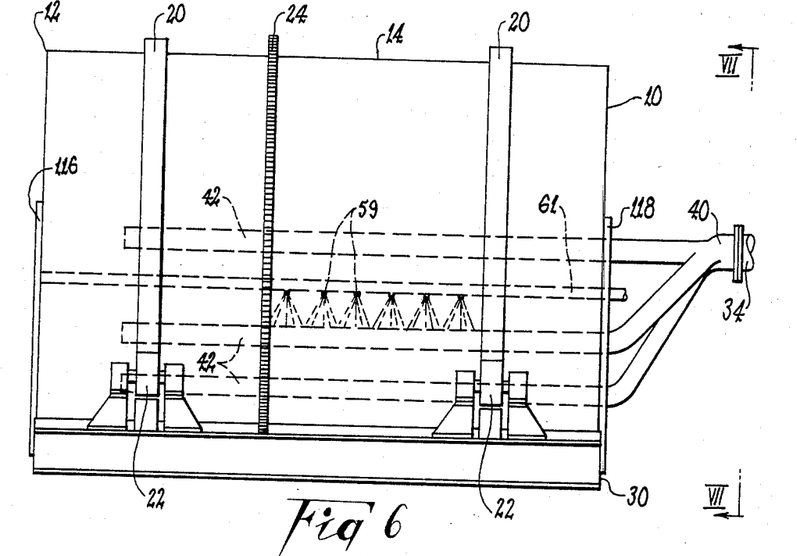
FIG. 6 shows, in a view corresponding to FIG. 1, an alternative form of apparatus.
Figure 7:
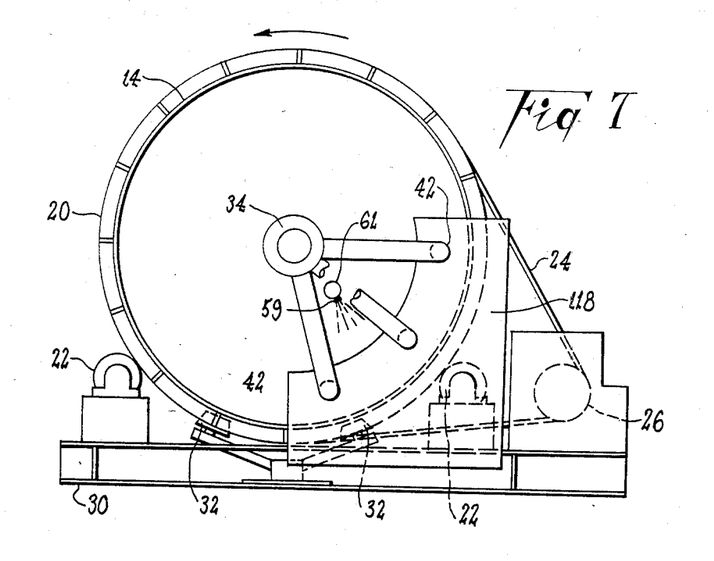
FIG. 7 shows an end elevation of FIG. 6.

Process liquid, which contains the required solid in the molten state, suspended in a liquid or dissolved in a solvent, is dispersed onto tumbling bed 38 of solids by means appropriate to the physical condition of the process liquid, such as by sprays 59 (for solutions or melts) spaced along conduit 61. As shown in FIGS. 6 and 7, conduit 61 extends longitudinally in vessel 12, via the opening of annular plate 118, above the bed. Heat is either introduced into or removed from the system so as to solidify solids of the process liquid, by either the vaporization of the solvent or carrier, or congelation of the process liquid.

Since in the rotary fluidiser the granules tumble over the fluid distribution pipes, and since wetted granules in a tumbling bed easily coalesce, granule growth occurs as a result of coalescence as well as onion skin type layering of solids.

The sprays 59 most conveniently are fitted in such a manner that the liquid impinges only onto tumbling bed 38 of granules and with suitable control of heat introduced into or removed from the system, wetting of the inner surface of cylinder 14 thus can be substantially prevented. As a consequence sticking of granules to that surface can be minimised so that bed 38 is retained as a single mass.

Best performance in regard to the tumbling action of the bed is obtained with the apparatus of the invention when the drum is rotating at a speed in the range 20% to 80% of the critical speed. The "critical speed" is defined as the speed at which the centrifugal force on a particle in contact with the drum equals, in the zenith of rotation, the gravitational forces on the said particle; that is, when $g = r w^2$, g being the acceleration due to gravity (9.81 m/sec/sec), r being the radius of the drum in meters and w being the angular velocity in radians per second. The critical speed $N_{cs}$ then is given by:

$$N_{cs} = \frac{42.3}{\sqrt{2r}} \text{ revolutions per minute.}$$

Figure 5:
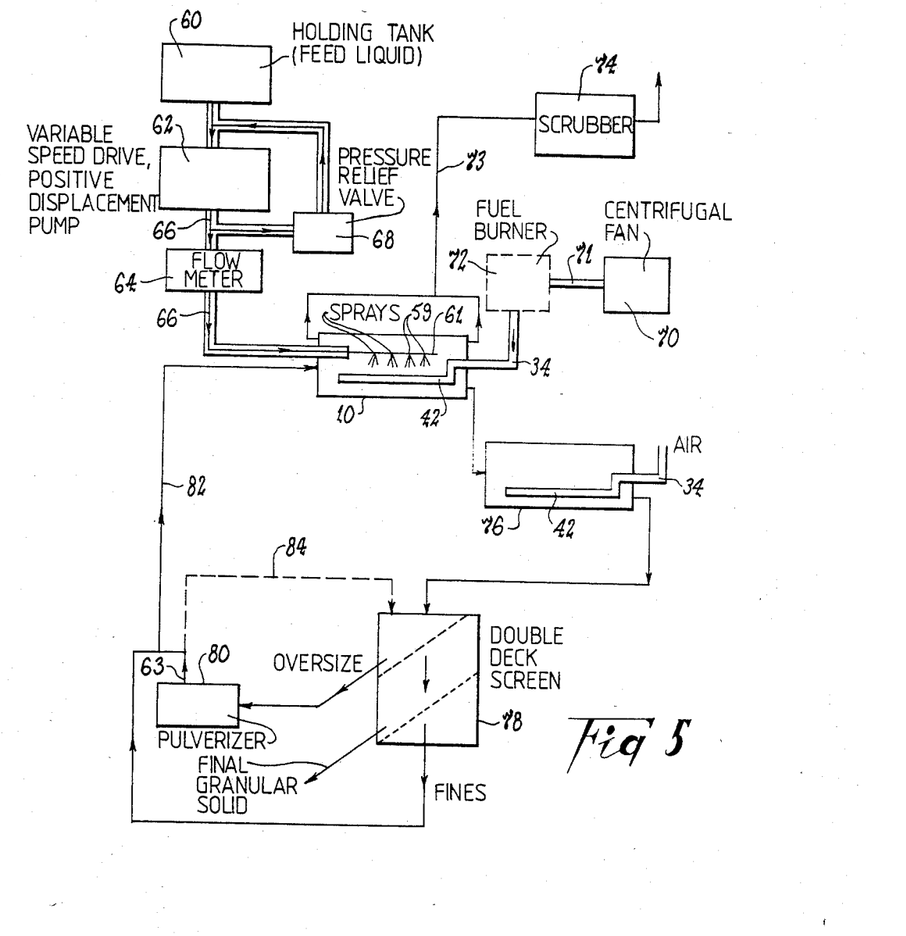
FIG. 5 is a flowsheet of a typical process using apparatus as in FIGS. 1 and 2.

According to this invention, the previously described apparatus may be operated in the manner depicted in FIG. 5, which shows a general flowsheet for a spray granulation or a melt granulation process. In the process, feed liquor, which is stored in a holding tank 60, is pumped by means of a variable speed drive positive displacement pump 62, through a conventional volumetric, float type flow indicator 64 to a row of sprays 59 in conduit 61, which are located parallel to the longitudinal centre line of the rotary fluidising spray/melt granulator 10. The temperature of the feed liquor lines 66 is controlled by means of an insulation sleeve or steamjacketting. Since the feed liquor is pumped by means of a positive displacement pump 62, a pressure relief valve 68 is fitted to the outlet end of the pump 62 to avoid damage to the latter, flowmeter 64 and liquor lines 66 in the event of blockage in line 66, conduit 61 or the feed liquor sprays 59. The outlet from the pressure relief valve 68 returns the feed liquor into the suction end of pump 62.

The speed of the variable speed drive pump 62 is controlled by the temperature of the tumbling bed in the rotary fluidising granulator 10. If the temperature of the tumbling bed is outside the desired temperature range the flow of feed liquor is either increased or decreased by speeding up or slowing down the speed of pump 62.

Fluidising gas, preferably air, is pumped by means of a conventional centrifugal fan 70 for discharge into the bed in granulator 10, via pipes 71,34 and conduits 42. If the process liquid is a solution or a suspension, solvent has to be removed from it for the recovery of the solid and, for this, the fluidising air is heated by means of a conventional fuel burner 72. Flame supervision and control of temperature of heated fluidising air is achieved by conventional means. However, if the process liquid is a melt, the air need not be heated at all or only to a relatively low temperature to provide a cooling in the bed.

The exit gas from the rotary fluidising spray granulator may have to be washed and, for this purpose, it may be collected and passed via line 73 to a conventional scrubber 74 for the removal of air impurities. The granules ex the rotary fluidising granulator may be further cooled in a rotary fluidising cooler 76, similar to granulator 10 but not including liquid supply pipe 61 and sprays 59. If the specifications for the desired size range of the product are extremely narrow, particles having a size outside the specifications can be removed by means of a conventional classifying device like a double-deck screen 78. The oversize ex the classifying device 78 is pulverized in a conventional pulverizer 80 and the stream 63 of pulverized material is recycled into the rotary fluidising spray granulator 10 by fines recycle stream 82.

The size of the granules is controlled by increasing or decreasing the recycle stream 82. Stream 82 can be decreased by returning part or the complete pulverized oversize ex the pulverizer 80 via stream 84 to the double-deck screen 78.

For a number of products the specifications in regard to product size are not very strict. This particularly applies to the upper limit in regard to the particle size. In this case it is possible to operate the process without a classifying device 78 or a pulverizer 80.

When the process is operating as a coating process, such as in coating urea with sulphur, the granules to be coated will be fed into the rotary fluidising granulator via the recycle stream 82.

With reference to FIGS. 6 and 7, the overall form of the apparatus shown therein is similar to that of the apparatus of FIGS. 1 and 2. To the extent that this is the case, the same reference numerals are used.

A principal difference with the apparatus of FIGS. 6 and 7 is that the annular plates 16,18 integral with cylinder 14 have been replaced by fixed weir plates 116,118. The latter are fixed on support 30, against rotation with cylinder 14, such as by bolts (not shown) enabling their removal for servicing. Plates 116,118 bear lightly against a respective end of cylinder 14 to provide a seal against the latter.

Plates 116,118 need cover only the lower quadrant of cylinder 14 in which bed 38 is located; bed 38 being omitted for clarity of illustration. It is found that this arrangement reduces the pressure drop through bed 38 and the gas supply and distribution system by up to 60% compared with the arrangement of FIGS. 1 and 2. Also, at least adjacent the ends of drum 12, it is found that plates 116,118, facilitate the discharge of oversize granules from bed 38, thereby reducing the tendency for the formation of gross oversize. Plates 116,118 also provide greater access to the interior of vessel 14 for servicing; it generally not being necessary that they be removed for this.

As plates 116,118 are fixed against rotation, headers 40 are not necessary. That is, as shown, conduits 42 can extend through the body of plates 116,118. Conduits 42 are shown as extending through plate 118 and they are supported within vessel 14 by that plate. Conduits 42 terminate short of plate 116, although they may extend to and be further supported by plate 116, if required.

In order to provide a better understanding, this invention will now be described in detail with the aid of the following examples which were established by means of a pilot rotary fluidising spray granulator as in FIGS. 1 and 2 or FIGS. 6 and 7 (as indicated), the granulator having the following dimensions:

Typical Dimensions of Pilot Rotary Fluidiser:
Diameter of rotary fluidising granulator (m): 0.568
Length of rotary fluidising granulator (m): 0.840
Total volume of rotary fluidising granulator (m$^3$):0.213
Critical speed of rotary fluidising granulator, $N_{cs}$ (r.p.m.): 56.15
Speed of rotation:
Actual (r.p.m.): 21
As % of critical speed (% of $N_{cs}$): 37.4
Clearance between conduit and drum (mm): 50
Number of conduits: 3
Internal diameter of conduit (mm): 44
Length of conduit (mm): 600
Lateral spacing between conduits (mm): 174
Total number of holes per conduit: 72
  Radius of holes:
  First 24 (mm): 2.0
  Second 24 (mm): 2.6
  Last 24 (mm): 3.1

EXAMPLE 1

According to the process shown in FIG. 5, granules of copper sulphate monohydrate (CuSO$_4$. H$_2$O) having a mean particle diameter of 3.5 mm were produced in apparatus as in FIGS. 1 and 2, starting with fines of the monohydrate, by using the process without means for classifying or pulverizing and without a recycle stream. This operation was performed under the following conditions:
Composition of feed liquor: Aqueous solution of copper sulphate
Concentration of feed liquor (% w/w CuSO$_4$.H$_2$O): 35.8
Density of feed liquor (g/cm$^3$): 1.40
Temp. of feed liquor (°C.): 80
Liquor feed rate
  (kg/h): 108
  (l/h): 77
Bed temperature (°C.): 120-130
Fluidising air flow ((a) m$^3$/h): 276
Fluidising air inlet temp. (°C.): 600
Fluidising air outlet temp. (°C.): 130
Production rate (kg CuSO$_4$.H$_2$O/h): 39
Product temp. ex cooler (°C.): 40

The granules produced were stable, dense and free flowing.

EXAMPLE 2

In Example 2 the pilot plant (FIGS. 1 and 2) was operated as shown in FIG. 5, and in a similar manner as in Example 1. The feed liquor to the plant was an aqueous solution of zinc sulphate, which was used for the production of a granular zinc sulphate monohydrate (ZnSO$_4$.H$_2$O), starting with a bed of fines of the monohydrate. The granules produced were spherical and in the 2 to 3.5 mm size range. Again no means for classifying or pulverizing had to be employed. The following conditions applied during the test:
Composition of feed liquor: Aqueous solution of zinc sulphate
Concentration of feed liquor (% w/w ZnSO$_4$.H$_2$O): 47.8
Density of feed liquor (g/cm$^3$): 1.598
Temp. of feed liquor (°C.): 80
Liquor feed rate
  (kg/h): 160
  (l/h): 100
Bed temperature (°C.): 95-105
Fluidising air flow ((a) m$^3$/h): 280
Fluidising air inlet temp. (°C.): 650
Fluidising air outlet temp. (°C.): 110
Production rate (kg ZnSO$_4$.H$_2$O): 77
Product temp. ex cooler (°C.): 40

The granules were uniformly sized and the surface texture was excellent. Granulation occurred as a result of coalescence of fines as well as onion skin type layering.

EXAMPLE 3

The procedure of Example 2 was repeated, but with a feed liquor to the pilot plant (FIGS. 1 and 2) of an aqueous solution of manganese sulphate and an initial bed of fines of that material. The pilot plant was again operated without a recycle stream.
Composition of feed liquor (% w/w MnSO$_4$, H$_2$O: 32
Density of feed liquor (g/cm$^3$): 1.47
Temperature of feed liquor (°C.): 40
Liquor feed rate
  (kg/h): 160
  (l/h): 109
Bed temperature (°C.): 100-110
Fluidising air inlet temp. (°C.): 650
Fluidising air outlet temp. (°C.): 115
Fluidising air flow ((a) m$^3$/h): 290
Production rate (kg MnSO$_4$. H$_2$O/h): 57
Product temp. ex cooler (°C.): 44

The granules produced were similar to those obtained in Example 2.

EXAMPLE 4

In Example 4 the pilot plant (FIGS. 1 and 2) was operated as shown in FIG. 5, but without a recycle stream. In this example the rotary fluidising granulator was used for the melt granulation of liquid sulphur, starting with a bed of crushed fines of sulphur. Solidification of the molten feed was achieved by feeding unheated air through the fluid distribution system of the rotary fluidiser. The molten sulphur was first cooled in a heat exchanger to 130° C. Granule formation was achieved by coalescence and by impingement and congealing of spray droplets upon the surface of the granules. The sulphur granules were spherical, dense and did not degrade during storage or handling. The following conditions applied during these tests:
Composition of feed: Molten sulphur
Density of feed (g/cm$^3$): 1.80
Temperature of feed (°C.): 130
Liquid feed rate (kg/h): 125

Fluidising air volume (m³/h at 20° C.): 206
Bed temperature (°C.): 80–105
Production rate (kg/h): 125

EXAMPLE 5

In this example molten urea was congealed as in the procedure and plant used in Example 4, starting with a bed of urea fines. The following conditions applied for these tests:
Composition of feed: Molten urea
Density of feed (g/cm³): 1.2
Feed temperature (°C.): 140
Liquid feed rate (kg urea/h): 26
Bed temperature (°C.): 80–120

The resultant urea granules were substantially spherical and dense, and of a narrow size spectrum; all being −3 mm, with 47.0% being +2 mm and 98.9% being +1 mm. The granules were of good strength and surface texture. Granule formation was by coalescence and by impingement and congealing of spray droplets upon the granule surface.

EXAMPLE 6

The procedure of Example 2 was repeated, but with an initial bed of aluminium sulphate fines, feed liquor of that sulphate having a basicity of 0.025% w/w cooled from 150° C. to 80° C. and plant as in FIGS. 6 and 7. Again, the treatment gas was air but, in this instance, it was unheated. The production rate was 163 kg of $Al_2(SO_4)_3.12 H_2O$ per hour.

It was found that granules could be produced without the tumbling bed degenerating into a sticky mass, and without aggregation of granules into "raspberry" type clumps. The granules were substantially spherical and of good strength.

EXAMPLE 7

In this example granular urea as produced in Example 5 was fed into a rotary fluidiser as in FIGS. 6 and 7, via the recycle stream 82, using a feed liquor of molten sulphur. The granules were heated to 90° C. by means of hot fluidising air and coated with molten sulphur. The production rate of sulphur coated urea was 500 kg per hour.

The following conditions applied during these tests:
Composition of feed: Molten sulphur
Density of feed (g/cm³): 1.80
Temperature of feed (°C.): 130
Liquid feed rate (kg/h): 100
Solid feed rate, urea (kg/h): 400
Bed temperature (°C.): 70–90

The resultant sulphur coated urea granules were produced with up to from 10 to 20% w/w of sulphur. The coating was substantially uniform, particularly with urea granules of narrow size spectrum.

Particularly with granules with a lesser thickness of sulphur coating, it was found that as with other procedures for coating granules with sulphur, there were some pin-holes in the coating. In a further operation, the sulphur coated urea granules discharged from the rotary fluidiser were returned to the rotary fluidiser via stream 82, and treated with a feed liquid of molten wax. In this instance, the fluidising air was at ambient temperature. This further operation produced sulphur coated urea granules sealed by a thin coating of wax; the production rate being similar to that for the sulphur coated urea granules.

EXAMPLE 8

In this example granules of clay were produced in plant as in FIGS. 6 and 7 from a slurry of clay slimes in water, using a tumbling bed of clay feed. The following conditions applied to this test:
Composition of feed slurry: 37% w/w suspension of clay slimes in water
Feed slurry temperature (°C.): 25
Slurry feed rate (kg/h): 95
Bed temperature (°C.): 100–140
Fluidising air inlet temp. (°C.): 630
Fluidising air flow ((a) m³/h): 286

The sizing of the clay feed providing the initial tumbling bed was −3 mm+1 mm and the sizing of the feed slurry was as follows:

| Microns | Cumulative % |
|---|---|
| +40 | 1.5 |
| +30 | 5.0 |
| +20 | 14.0 |
| +15 | 25.0 |
| +10 | 48.2 |
| +8 | 54.4 |
| +6 | 66.3 |
| +4 | 72.0 |
| +2 | 80.8 |
| +1 | 89.1 |

With such feed, it was found that the resultant product comprised pellets of good crush strength. The pellets were of narrow size spectrum, with the average size ranging from 3 mm to in excess of 10 to 15 mm, depending on the processing time.

The method provided by the invention is well suited for the one step processing of solids in a uniformly sized granular form from their melts, solutions or suspensions, or the application of a coating system to granules. The foregoing examples illustrate this. Also, it will be appreciated that the process is capable of use in a wide variety of ways to provide composite granular material. Thus, the initial tumbling bed may, as in coating urea with sulphur or the resultant sulphur coated urea with wax, be of a material different to that of the feed liquor to be formed thereon. This different material may be an inert material such as sand or, again as in coating urea with sulphur, it may be an active material.

As also will be appreciated, the invention is of particular value in enabling granulation of slimes, such as clay slimes. The latter materials frequently are waste materials which present a problem in safe disposal. However, granulation of slime can facilitate disposal or, as with clay slimes, it can produce a useful commercial product. Clay granulation according to the invention has been found to be a product readily able to be compressed and fired, such as to permit production of good bricks. Also, rather than starting with a tumbling bed of fine clay, the granulation can be facilitated by use of a tumbling bed of sand or other inert material.

It is understood that various modifications and/or alterations may be made without departing from the spirit and ambit of the invention as outlined above.

We claim:

1. Apparatus for the formation of granular solids, said apparatus comprising: a vessel defined by a cylindrical shell having its axis substantially horizontal, a respective end plate at each end of the shell, means for charging a treatment gas into the vessel from a source thereof, and means for charging processing liquid into the vessel from a source thereof, said vessel being open at said ends to enable particulate raw material solids to be charged continuously through one end thereof into the shell and to enable granular solids to be discharged continuously from the other end thereof; said shell being rotatable at from 20% to 80% of its critical speed of rotation so that a tumbling bed of said particulate solids is formed and retained during rotation substantially within the second one, in the direction of said rotation, of the lower quadrants of the shell; said gas charging means comprising a gas supply pipe passing into the vessel through an end thereof, and a plurality of gas discharge conduits in communication with the gas supply pipe and extending within and along substantially the full length of the shell; each of said gas discharge conduits being fixed, within said second quadrant, against rotation with the shell, and having port means comprising a plurality of outlets spaced along substantially its full length; said conduits being fixed within said second quadrant at a location such that during rotation of the shell, each of said conduits is within said tumbling bed by engagement therewith, and at a location such that each of said conduits is spaced from, and discharges said gas from its outlets downwardly toward said shell to cause the gas to be discharged within said bed and to effect contact between said gas and particulate material of the bed at substantially below the elutriation velocities for particles of said material; the means for charging processing liquid having at least one outlet fixed within the shell at a location such that, during rotation of the shell, said liquid charging means is spaced above the bed and liquid discharged therefrom contacts the bed from above along a major portion of the length of said shell with said portion being spaced from said other end of the shell by a minor portion of said length; said gas discharge means being adapted to maintain said tumbling bed in a quasi-fluidized condition along substantially the full length of said shell under the action of said downwardly discharged gas from said outlets and mechanical dispersion of the particulate material of the bed by said conduits, and further adapted to dry said particulate material with respect to liquid from said liquid charging means prior to discharge from said minor portion of said length of the shell.

2. Apparatus according to claim 1, wherein each of said end plates is annular and defines a central end opening with each end integral with said shell, said supply pipe extending through one of said openings and being in communication with said conduits by means of at least one radially extending connector pipe.

3. Apparatus according to claim 1, wherein each end plate is fixed against rotation with said shell and bears against the respective end of the latter; the end plates covering sufficient of said ends to retain said bed in the vessel during rotation of the shell, each of said conduits extending from and being supports within the vessel by one of said end plates and being in communication with said supply pipe through said one end plate.

4. Apparatus according to claim 3, wherein each end plate is fixed against rotation with said shell and bears against the respective end of the latter; the end plates covering sufficient of said ends to retain said bed in the vessel during rotation of the shell, each of said conduits extending from and being supported within the vessel by one of said end plates and being in communication with said supply pipe through said one end plate.

5. Apparatus according to claim 1, wherein said means for supplying process liquid comprises a pipe extending longitudinally within said vessel and having a plurality of spray nozzles spaced therealong.

6. Apparatus according to claim 5, wherein said plurality of spray nozzles spaced longitudinally in said vessel over a major portion of the length of the vessel are spaced from said other end of the vessel to enable discharge of substantially dry granular solid from the vessel at said other end.

7. A method for the formation of granular solids, said method comprising the steps of:
(a) charging particulate raw material feed solids to one end of a vessel comprising a horizontally disposed rotating shell and a respective end plate at each end of the shell, to form a tumbling bed of particulate solids which bed is substantially retained in the second one, in the direction of rotation of the shell, of the lower quadrants of the vessel;
(b) simultaneously with rotation of said shell, charging treatment gas from a source thereof to a supply pipe passing into the vessel from one end thereof, and from the supply pipe to a plurality of discharge conduits each extending within and along substantially the full length of said shell, each said conduit having port means comprising a plurality of downwardly opening gas outlets spaced along substantially its full length and being fixed against rotation with said shell at a location, within said tumbling bed and spaced from the shell, such that each of said conduits mechanically disperses particulate material of the bed by engagement therewith and discharges said gas downwardly within said bed and toward the shell to effect contact between said gas and particulate material in which said bed is maintained in a quasi-fluidized condition along substantially the full length of said shell under the action of said downwardly discharged gas from said outlets and mechanical dispersion, said contact being substantially below elutriation velocities for particles of said material;
(c) simultaneously with charging said treatment gas, charging processing liquid into said vessel so as to be released therein from at least one outlet spaced above the bed such that the processing liquid contacts the bed from above along a major portion of the length of said shell which portion is spaced from said other end of the shell; and
(d) simultaneously with charging said treatment gas and processing liquid, discharging granular solids from the other end of the vessel, said discharged solids being substantially dried with respect to said liquid by said gas.

8. A method according to claim 7, wherein said process liquid is a melt.

9. A method according to claim 8, wherein said process liquid is a melt of a material selected from urea and sulphur with feed solids being urea where said process liquid is a melt of urea and selected from urea and sulphur where said process liquid is a melt of sulphur.

10. A method according to claim 7, wherein said process liquid is selected from solutions and suspensions, and said treatment gas is heated prior to being discharged into said bed.

11. A method according to claim 10, wherein said process liquid is a solution of a material selected from copper sulphate, zinc sulphate and manganese sulphate and the feed solids comprise particles of a composition the same as said material.

12. A method according to claim 10, wherein said process liquid is a slime suspension, such as a clay slime, and the feed solids comprise particles selected from compositions the same as the solids of said liquid and inert particulate material.

* * * * *